United States Patent
Buechner et al.

(10) Patent No.: US 10,882,942 B2
(45) Date of Patent: Jan. 5, 2021

(54) AQUEOUS POLYCARBODIIMIDE DISPERSION WITH IMPROVED STORAGE STABILITY, AND METHOD FOR PRODUCING SAME

(71) Applicant: Covestro Deutschland AG, Leverkusen (DE)

(72) Inventors: Joerg Buechner, Bergisch Gladbach (DE); Michael Ludewig, Odenthal (DE); Evgeny Avtomonov, Leverkusen (DE); Martin Melchiors, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/769,756

(22) PCT Filed: Dec. 12, 2018

(86) PCT No.: PCT/EP2018/084557
§ 371 (c)(1),
(2) Date: Jun. 4, 2020

(87) PCT Pub. No.: WO2019/121238
PCT Pub. Date: Jun. 27, 2019

(65) Prior Publication Data
US 2020/0385508 A1    Dec. 10, 2020

(30) Foreign Application Priority Data

Dec. 21, 2017 (EP) ..................... 17209822

(51) Int. Cl.
*C08G 18/02* (2006.01)
*C08G 18/75* (2006.01)
*C08G 18/22* (2006.01)
*C08J 3/07* (2006.01)
*C08G 18/28* (2006.01)
*C08K 3/16* (2006.01)

(52) U.S. Cl.
CPC ......... *C08G 18/025* (2013.01); *C08G 18/225* (2013.01); *C08G 18/283* (2013.01); *C08G 18/758* (2013.01); *C08J 3/07* (2013.01); *C08J 2379/08* (2013.01)

(58) Field of Classification Search
USPC .................................. 524/591, 871; 525/907
See application file for complete search history.

(56) References Cited

U.S. PATENT DOCUMENTS

| | | | |
|---|---|---|---|
| 5,688,875 A | 11/1997 | Sasaki et al. | |
| 5,866,715 A * | 2/1999 | Tsai | ...... C07C 267/00 528/78 |
| 7,439,316 B2 | 10/2008 | Hesselmans et al. | |
| 9,353,221 B2 | 5/2016 | Achten et al. | |
| 10,647,850 B2 * | 5/2020 | Tsukamoto | ...... C08G 18/283 |

FOREIGN PATENT DOCUMENTS

WO    WO 2011120928 A2    10/2011

OTHER PUBLICATIONS

International Search Report, PCT/EP2018/084557, dated Feb. 21, 2019, Authorized officer: Martin Bergmeier.

* cited by examiner

*Primary Examiner* — Fred M Teskin
(74) *Attorney, Agent, or Firm* — Jed C. Benson

(57) ABSTRACT

The invention relates to storage-stable aqueous dispersions of hydrophilically modified polycarbodiimide resins, a method for producing same, and the use of a salt component to reduce carbodiimide hydrolysis in aqueous polycarbodiimide dispersions.

15 Claims, No Drawings ved storage stability of
these aqueous dispersions is achieved by adjusting the pH to
a value between 9 and 14 through addition of a base or a
buffer. According to the teaching of this publication, the
polycarbodiimide dispersions are stable for 8 weeks at 50°
C. However, this document makes no statements about how
the storage stability is assessed or measured. In particular,
there is no information on the percentage by which the
content of carbodiimide groups falls during storage and
under what conditions.

Tests carried out by the applicant showed that, during
storage at 50° C., the carbodiimide content of a polycarbodiimide dispersion prepared according to the teaching of this
publication and adjusted to pH 9 with sodium hydroxide
solution falls by approx. 40% within 8 weeks and at pH 10
falls by approx. 15%.

AQUEOUS POLYCARBODIIMIDE DISPERSION WITH IMPROVED STORAGE STABILITY, AND METHOD FOR PRODUCING SAME

CROSS-REFERENCE TO RELATED APPLICATION

This application is a national stage application under 35 U.S.C. § 371 of PCT/EP2018/084557, filed Dec. 12, 2018, which claims the benefit of European Application No. 17209822, filed Dec. 21, 2017, each of which is incorporated herein by reference.

FIELD

The present invention relates to storage-stable aqueous dispersions of hydrophilically modified polycarbodiimide resins, to a method for the preparation thereof, and to the use of a salt component to reduce carbodiimide hydrolysis in aqueous polycarbodiimide dispersions.

BACKGROUND

Polycarbodiimide resin dispersions as crosslinking agents for dispersion polymers containing carboxyl groups are already known.

For example, EP 0686626 A1 describes a hydrophilically modified tetramethylxylylene carbodiimide having an average degree of polymerization of 1-30. A particular feature of the aqueous dispersion of this polycarbodiimide resin is the good storage stability thereof. Disadvantages of the polycarbodiimide described in this publication are, however, the large amount of catalyst needed for the carbodiimidization and the very low reactivity of the polycarbodiimide.

EP 2552982 A2 discloses a method for preparing polycarbodiimide from aliphatic or cycloaliphatic diisocyanate in which the carbon dioxide reaction gas evolved during the carbodiimidization is removed from the reaction mixture from time to time or permanently. The advantage of this methodology is the small amount of the catalyst needed for the carbodiimidization.

EP 1644428 A2 (WO 2005/003204 A2) describes a method for preparing stable aqueous polycarbodiimide dispersions that contain no organic solvents and are suitable for use as crosslinking agents. The improved storage stability of
these aqueous dispersions is achieved by adjusting the pH to
a value between 9 and 14 through addition of a base or a
buffer. According to the teaching of this publication, the
polycarbodiimide dispersions are stable for 8 weeks at 50°
C. However, this document makes no statements about how
the storage stability is assessed or measured. In particular,
there is no information on the percentage by which the
content of carbodiimide groups falls during storage and
under what conditions.

Tests carried out by the applicant showed that, during
storage at 50° C., the carbodiimide content of a polycarbodiimide dispersion prepared according to the teaching of this
publication and adjusted to pH 9 with sodium hydroxide
solution falls by approx. 40% within 8 weeks and at pH 10
falls by approx. 15%.

Another particular feature of polycarbodiimide dispersions comprising aliphatic and cycloaliphatic polycarbodiimide resins is their low toxicity. According to the German Ordinance on Hazardous Substances, substances or mixtures having a pH of ≥11.5 can be classified as "corrosive" and must then be labeled with the "corrosive" hazard symbol (GHS05) and the signal word "hazard". This applies also to the teaching of EP 1644428 A2 (WO 2005/003204 A2).

SUMMARY

There is a market demand for polycarbodiimide dispersions, particularly for storage at a temperature of 60° C., that are not hazardous substances within the meaning of the Ordinance on Hazardous Substances. During hot storage at 60° C. for a period of 5 days, the carbodiimide content of storage-stable polycarbodiimide dispersions should decrease less strongly than in the case of untreated polycarbodiimide dispersions.

The object is achieved in accordance with the invention by a dispersion as claimed in claim 1, by a method as claimed in claim 10, and by a use as claimed in claim 15. Advantageous developments are specified in the dependent claims and in the description hereinbelow. They may be freely combined, unless the opposite is clearly evident from the context.

DETAILED DESCRIPTION

An aqueous polycarbodiimide dispersion accordingly has the particular features that the dispersion comprises a salt component that comprises at least one salt having a cation and an anion that is present in its highest deprotonation level and in this highest deprotonation level has a base strength ($pK_B$) of ≥9 and the dispersion has an electrical conductivity in accordance with DIN EN 27888 and measured at 20° C. that is higher than that of a dispersion minus the salt component but otherwise identical, wherein, when the salt component comprises magnesium sulfate and/or calcium sulfate, at least one further anion having a base strength ($pK_B$) of ≥9 is present in its highest deprotonation level in the salt component, and wherein, when the salt component comprises aluminum (III) chloride in a content of ≥95 mol %, the electrical conductivity of the dispersion in accordance with DIN EN 27888 and measured at 20° C. is ≤1000% of the conductivity of a dispersion minus the salt component but otherwise identical.

It has been surprisingly found that the dispersions of the invention, even without adjusting the pH to pH>9 with a base and/or buffer as described in EP 1644428 A2 (WO 2005/003204 A2), show increased storage stability, that is to say a smaller decrease in the carbodiimide content, compared to untreated dispersions. This can be observed without extensive long-term tests by storing the samples at 60° C. for 120 hours.

The salt component comprises at least one salt having an anion and a cation. The salt component may also comprise a plurality of salts or a mixed salt having a plurality of anions and a plurality of cations. According to the invention, at least one anion is present in its highest deprotonation level in the salt component and in this highest deprotonation level has a base strength ($pK_B$) of ≥9 (preferably ≥10).

"Highest deprotonation level" here means that the anion no longer has any acidic protons. If the anion is formed from a two-proton acid, the highest deprotonation level is the doubly negatively charged anion. The same applies if the anion is formed from a three-proton acid, in which case the highest deprotonation level is the triply negatively charged anion. Because the anion is present in the highest deprotonation level, it is moreover unable to act as a buffer.

The base strength ($pK_B$) of the anion in the highest deprotonation level is measured under standard conditions and can in many cases be looked up in tables. Examples of such anions having a $pK_B$ of 9 or more are ($pK_B$ in brackets): $ClO_4^-$ (24), $I^-$ (24), $Br^-$ (22.9), $Cl^-$ (20), $NO_3^-$ (15.32), $SO_4^{2-}$ (12.08), $F^-$ (10.86), and $HCOO^-$ (10.25).

The anions are thus very weak bases. If the anions derive not from Brønsted acids but from Lewis acids, it is not strictly speaking possible to determine the $pK_B$. However, since such anions are also very weak bases, they according to the invention likewise come under the definition "$pK_B \geq 9$". Examples of such anions are $BF_4^-$, $BPh_4^-$, and $AlCl_4^-$.

The invention also encompasses, as salts for the salt component, halides of main group metals, such as $AlCl_3$ and $SnCl_2$, and halides of subgroup metals, such as $FeCl_2$. If the main or subgroup metal has more than one possible oxidation state, preference is given to halides of the metal in the lowest positive oxidation state. An example is the preference for Sn(II) over Sn(IV).

Without being bound to any particular theory, it is assumed that the improved storage stability of the dispersions of the invention is at least indirectly connected to their electrical conductivity. The dispersion of the invention accordingly has an electrical conductivity in accordance with DIN EN 27888 and measured at 20° C. that is higher than that of a dispersion minus the salt component but otherwise identical. Thus, in the case of an untreated dispersion, the conductivity can be determined, the salt component then added, and the conductivity determined again thereafter. This provides verification that the conductivity after adding the salt component is higher than before.

If the salt component comprises magnesium sulfate and/or calcium sulfate, at least one further anion having a base strength ($pK_B$) of $\geq 9$ (preferably $\geq 10$) should be present in its highest deprotonation level in the salt component. It is, however, preferable that the salt component does not contain magnesium sulfate or calcium chloride.

When the salt component comprises aluminum(III) chloride in a content of $\geq 95$ mol %, the electrical conductivity of the dispersion in accordance with DIN EN 27888 and measured at 20° C. should in accordance with the invention be $\leq 1000\%$ (preferably $\leq 500\%$) of the conductivity of a dispersion minus the salt component but otherwise identical. This is a trade-off between the electrical conductivity conferred by the $AlCl_3$ and the acid hydrolysis of the carbodiimide groups in the dispersion.

The polycarbodiimide in the aqueous dispersions of the invention is preferably obtainable from isophorone diisocyanate (IPDI), hexamethylene diisocyanate (HDI), hydrogenated xylylene diisocyanate (H6XDI) or dicyclohexylmethane 4,4'-diisocyanate (H12MDI) or from monomethoxypolyethylene glycol and butoxyethanol. The polycarbodiimide can have an average functionality of 1 to 10 carbodiimide units, 2 to 7 carbodiimide units or 3 to 6 carbodiimide units per molecule.

The aqueous dispersions of the invention are particularly suitable as a constituent of binders for coating agents or impregnating agents, for example for adhesives, coatings, paints, paper coating compositions or as binders for nonwovens, i.e. in all situations in which crosslinking and an increase in internal strength (cohesion) is desired.

Depending on the intended use, the aqueous dispersion may comprise additives such as thickeners, flow-control agents, pigments or fillers, bactericides, fungicides, etc.

When used as an adhesive, the aqueous dispersions of the invention may comprise, in addition to the abovementioned additives, specific auxiliaries and additives customary in adhesives technology. Examples of these include thickeners, plasticizers or tackifying resins such as natural resins or modified resins, for example rosin esters, or synthetic resins such as phthalate resins.

Polymer dispersions used as an adhesive particularly preferably comprise alkyl (meth)acrylates as main monomers in the polymer. Preferred uses in the field of adhesives also include laminating adhesives, for example for composite lamination and high-gloss film lamination (gluing transparent films with paper or cardboard). The aqueous dispersions of the invention may be applied by customary methods to the substrates to be coated or to be impregnated.

In particular, objects made of wood, metal, textile, leather or plastics may be bonded, impregnated or coated with the aqueous dispersions of the invention as a constituent of binders.

In one embodiment, the dispersion has an electrical conductivity in accordance with DIN EN 27888 and measured at 20° C. that is $\geq 140\%$ (preferably $\geq 200\%$, more preferably $\geq 250\%$) of the conductivity of a dispersion minus the salt component but otherwise identical.

In a further embodiment, the dispersion has an electrical conductivity in accordance with DIN EN 27888 and measured at 20° C. of $\geq 300$ µS/cm (preferably $\geq 350$ µS/cm, more preferably $\geq 400$ µS/cm).

In a further embodiment, the salt component comprises a halide anion. Preference here is given to chloride.

In a further embodiment, the salt component comprises an alkali metal cation or alkaline earth metal cation. Lithium and/or sodium cations are preferred.

Further preferably, the salt component comprises LiCl and/or NaCl. The salt component cannot contain any salts other than LiCl and/or NaCl.

In a further embodiment, the dispersion was additionally at least partially freed of $CO_2$ by application of vacuum. This further increases the storage stability of the dispersion.

In a further embodiment, the dispersion has a pH of $\geq 5$ to $\leq 9.8$. A pH of $\geq 6$ to $\leq 8.9$ is preferred.

In a further embodiment, the salt component is present in a proportion by weight of $\geq 0.01\%$ to $\leq 1\%$ (preferably $\geq 0.02\%$ to $\leq 0.8\%$, more preferably $\geq 0.06\%$ to $\leq 0.5\%$) based on the total weight of the dispersion.

In a further embodiment, the dispersion contains $\geq 90\%$ (preferably $\geq 95\%$) of the original polycarbodiimide content after storage at 60° C. for 120 hours. The carbodiimide concentration can be determined by ATR (attenuated total reflection) infrared spectroscopy. Calibration is effected with the aid of dicyclohexylcarbodiimide (DCC) solutions of known concentration. The peak areas ($P_A$) of the carbodiimide band at approx. 2118 $cm^{-1}$ are determined. The data (concentration of the DCC solutions and measured $P_A$ values) are used to generate a calibration line. The carbodiimide concentration in the sample is determined from $P_A$ of the band at approx. 2118 $cm^{-1}$. The concentration [meq DCC/g] is calculated from $P_A/m$, where m represents the slope of the calibration line.

The present invention further provides a method for preparing an aqueous polycarbodiimide dispersion, comprising the following steps:
A) reacting a polyisocyanate in the presence of a carbodiimidization catalyst to obtain a polycarbodiimide;
B) adding a compound that contains at least one group reactive toward isocyanate and/or carbodiimide groups during or after polycarbodiimide formation in step A); and C) dispersing the compound obtained after step B) in water to obtain a dispersion.

The method also includes the following step:

D) adding a salt component to:
- the water used in step C) before and/or during the dispersion,
- the dispersion obtained after step C),
- the polyisocyanate used in step A) and/or
- the compound used in step B)

with the result that the dispersion has an electrical conductivity in accordance with DIN EN 27888 and measured at 20° C. that is higher than that of a dispersion minus the salt component but otherwise identical, wherein the salt component comprises at least one salt having a cation and an anion that is present in its highest deprotonation level and in this highest deprotonation level has a base strength ($pK_B$) of ≥9 (preferably ≥10), wherein, when the salt component comprises magnesium sulfate and/or calcium sulfate, at least one further anion having a base strength ($pK_B$) of ≥9 (preferably ≥10) is present in its highest deprotonation level in the salt component, and wherein, when the salt component comprises aluminum (III) chloride in a content of ≥95 mol %, the electrical conductivity of the dispersion in accordance with DIN EN 27888 and measured at 20° C. is ≤1000% of the conductivity of a dispersion minus the salt component but otherwise identical.

In step B) a compound is preferably used that contains a hydrophilic group and at least one group reactive toward isocyanate and/or carbodiimide groups.

The designation as A) to D) of the steps in the method of the invention is to be understood as meaning that no rigid chronological sequence is intended, but with this serving merely to distinguish the method steps.

Details of the salt component have already been described in connection with the dispersion of the invention and do not need to be repeated in every detail with regard to the method.

The polyisocyanate converted to the polycarbodiimide in step A) may be an aliphatic or aromatic polyisocyanate.

The conversion of polyisocyanate to polycarbodiimide is carried out in the presence of a carbodiimidization catalyst, preferably in a concentration of 50 to 3000 ppm, more preferably in the presence of 150 to 1000 ppm, most preferably in the presence of 200 to 700 ppm of carbodiimidization catalyst, based on the molar amount of polyisocyanate.

Examples of suitable carbodiimidization catalysts are various phospholene oxides, for example 1-methyl-2- (and/or 3-) phospholene-1-oxide, 3-methyl-2- (and/or 3-) phospholene-1-oxide, 1-phenyl-2- (and/or 3-) phospholene-1-oxide, 1-phenyl-3-methyl-2- (and/or 3-) phospholene-1-oxide and 1-ethyl-2- (and/or 3-) phospholene-oxide. These catalysts normally remain in the products.

The conversion of polyisocyanate into polycarbodiimide in step A) is preferably carried out in the range from 50 to 250° C., preferably 160 to 230° C., more preferably 185 to 205° C. The reaction in step A) may be carried out, for example, such that a polycarbodiimide having an average functionality of 1 to 10 carbodiimide units, 2 to 7 carbodiimide units or 3 to 6 carbodiimide units per molecule is obtained.

In step B), the polycarbodiimide is preferably reacted with at least one hydrophilic compound that bears at least group reactive toward isocyanate and/or carbodiimide groups. Examples of such compounds are selected from the group consisting of polyethoxymonools, polyethoxydiols, polyethoxypolypropoxymonools, polyethoxypolypropoxydiols, polyethoxymonoamines, polyethoxydiamines, polyethoxypolypropoxymonoamines, polyethoxypolypropoxydiamines, hydroxyalkylsulfonates, amine alkylsulfonates, polyethoxymonothiols and -dithiols, polyethoxymonocarboxylic acids and -dicarboxylic acids, mono- and dihydroxycarboxylic acids, and the salts thereof and mixtures of the abovementioned compounds. A hydrophilized polycarbodiimide is obtained in which unreacted isocyanate groups may optionally be reacted with other compounds reactive toward isocyanate groups, for example, water, alcohols, thiols, amines, mineral acids or carboxylic acids.

In step C), the compound obtained after step B) is dispersed in water to obtain a dispersion. The content of dispersed polycarbodiimide may, for example, be ≥10% to ≤90% by weight based on the total weight of the dispersion. It is preferably ≥30% by weight to ≤50% by weight, more preferably ≥35% by weight to ≤45% by weight.

The salt component in step D) may in principle be added at any point in the process. A preferred variant is for the salt component to be added to the water used for the dispersion before dispersion. It is likewise possible for the salt component to be added during the dispersion process. It is more preferable for the salt component to be added once dispersion has been carried out. This affords the option of measuring the electrical conductivity of the dispersion before and after adding the salt.

In one embodiment of the method, the salt component comprises a halide anion and/or an alkali metal or alkaline earth metal cation. Chloride anions and lithium and/or sodium cations are preferred.

Further preferably, the salt component comprises LiCl and/or NaCl. The salt component cannot contain any salts other than LiCl and/or NaCl.

In a further embodiment of the method, the dispersion was additionally at least partially freed of $CO_2$ by application of vacuum. This further increases the storage stability of the dispersion.

In a further embodiment of the method, the polyisocyanate in step A) is an aliphatic polyisocyanate. The aliphatic polyisocyanate (including also cycloaliphatic polyisocyanates) is preferably a polyisocyanate from the group consisting of methylene diisocyanate, dimethylene diisocyanate, trimethylene diisocyanate, tetramethylene diisocyanate, pentamethylene diisocyanate, dipropyl ether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropyl ether diisocyanate, thiodihexyl diisocyanate, meta-xylylene diisocyanate, para-xylylene diisocyanate, tetramethylxylylene diisocyanate, dicyclohexylmethane 4,4'-diisocyanate (H12MDI), isophorone diisocyanate (IPDI), hexamethylene diisocyanate (HDI), hydrogenated xylylene diisocyanate (H6XDI), dodecane 1,12-diisocyanate (DDI), norbornane diisocyanate (NBDI) and 2,4-bis(8-isocyanatooctyl)-1,3-dioctylcyclobutane (OCDI) or mixtures thereof.

Particular preference is given to isophorone diisocyanate (IPDI), hexamethylene diisocyanate (HDI), hydrogenated xylylene diisocyanate (H6XDI), and dicyclohexylmethane 4,4'-diisocyanate (H12MDI). Most preferably, the cycloaliphatic polyisocyanate is dicyclohexylmethane 4,4'-diisocyanate (H12MDI).

The invention further relates to the use of a salt component for reducing carbodiimide hydrolysis in aqueous polycarbodiimide dispersions, wherein the salt component comprises at least one salt having a cation and an anion that in its highest deprotonation level has a base strength ($pK_B$) of ≥9 (preferably ≥10), wherein, when the salt component comprises aluminum (III) chloride, magnesium sulfate and/or calcium sulfate, at least one further anion that is present in its highest deprotonation level and in this highest deprotonation level has a base strength ($pK_B$) of ≥9 (preferably ≥10) is present in the salt component.

Details of the salt component have already been described in connection with the dispersion of the invention and do not need to be repeated in regard to use. It should merely be noted that, in one embodiment of the use, the salt component comprises a halide anion. Preference here is given to chloride. In a further embodiment of the use, the salt component comprises an alkali metal cation or alkaline earth metal cation. Lithium and/or sodium cations are preferred. Further preferably, the salt component comprises LiCl and/or NaCl. The salt component cannot contain any salts other than LiCl and/or NaCl.

EXAMPLES

The present invention is elucidated further by the examples that follow, without being restricted thereto.
Starting Materials:
Cycloaliphatic polyisocyanate H12MDI:
   4,4'-Diisocyanatodicyclohexylmethane, CAS No. 79103-62-1
   (Desmodur® W, Covestro Deutschland AG, Leverkusen, Germany)
Carbodiimidization catalyst 1,1-MPO: technical mixture of 1-methyl-2-phospholene-1-oxide and 1-methyl-3-phospholene-1-oxide, CAS No. 872-45-7 and 930-38-1 (Clariant AG, Muttenz, Switzerland)
Monomethoxypolyethylenglycol 750, MPEG 750: CAS No. 9004-74-4: (Aldrich, Germany)
Butoxyethanol: CAS No. 111-76-2: (SysKem Chemie GmbH, Wuppertal, Germany)
Methods:
Determination of average particle size: The particle size of the polycarbodiimide droplets in the dispersions/solutions are determined by laser correlation spectroscopy (instrument: Malvern Zetasizer 1000, Malvern Inst. Limited).
Conductivity: The electrical conductivity [μS/cm] is determined using a SevenCompact S230 conductivity meter from Mettler Toledo in combination with an InLab 710 measurement probe. This was done in accordance with standard DIN EN 27888.
Determination of the nonvolatiles fraction: The nonvolatiles fraction in the dispersions polycarbodiimide is determined in accordance with DIN EN ISO 3251, with the conditions in the investigations being defined by the following parameters: 0.5 g/120 min/125° C.
Stability testing: The polycarbodiimide dispersions were stored in closed PE bottles at 60° C. for a period of 120 hours. The carbodiimide concentration, electrical conductivity, and pH of the samples were determined before and after hot storage.
Determination of the carbodiimide concentration: The carbodiimide concentration is determined by ATR infrared spectroscopy on a Perkin Elmer Spectrum Two.
   Firstly, solutions of dicyclohexylcarbodiimide (DCC) in ethanol were prepared (concentrations: 0.1 mmol/g, 0.2 mmol/g, 0.5 mmol/g, 1.0 mmol/g, 1.5 mmol/g, and 2 mmol/g). The IR spectra of these solutions were recorded. The peak areas ($P_A$) of the carbodiimide band at approx. 2118 cm$^{-1}$ were determined. The data (concentration c of the DCC solutions and measured $P_A$ values) were used to generate a calibration line:
   $P_A$=m·c [meq DCC/g], where m is the slope of the calibration lines.
   The carbodiimide concentration is determined from $P_A$ of the band at approx. 2118 cm$^{-1}$. The concentration [meq DCC/g] is calculated from $P_A$/m.
   The change in the carbodiimide concentration is reported as a percentage of the baseline value. Based on the measurement conditions, the reported values for the change in the carbodiimide concentration is assumed to be accurate to ±5 percentage points.

Unless otherwise stated, all analytical determinations refer to a temperature of 23° C. The reference temperature of the meter for the electrical conductivity was 20° C.
Preparation of the Polycarbodiimide Dispersions
Polycarbodiimide dispersions pCDI 1 to pCDI 6 were prepared in accordance with example 2 from WO 2011/120928 A2 (=EP 2552982 A2). This afforded an almost transparent dispersion having a pH of between 7 and 9.7, an average particle size of 35 nm, and a nonvolatiles fraction (solids content) of approx. 40% by weight. Dispersion pCDI 5 was freed of dissolved $CO_2$ by application of vacuum.

Stabilization of the polycarbodiimide dispersion: 0.01% to 1.0% by weight of salt was added to the polycarbodiimide dispersion to adjust the conductivity to a value >250 μS/cm.

The results obtained are shown in the tables below. Examples marked with (*) are comparative examples.

Example 1: pCDI 1

| | | Before hot storage | | | | After hot storage 120 h/60° C. | | | Decrease |
|---|---|---|---|---|---|---|---|---|---|
| Salt | Salt [wt.-%] | pH | μS/cm | % of μS/cm without salt | meq DCC/g | pH | μS/cm | meq DCC/g | meq DCC/g [%] |
| without (*) | 0 | 9.7 | 227 | 100% | 1.05 | 10.4 | 271 | 0.64 | −39.0 |
| NaCl | 0.05 | 9.8 | 831 | 366% | 1.05 | 10.2 | 765 | 0.83 | −21.0 |
| NaCl | 0.10 | 9.8 | 1491 | 657% | 1.02 | 10.1 | 1399 | 0.91 | −10.8 |
| NaCl | 0.20 | 9.8 | 2531 | 1115% | 1.06 | 10.1 | 1410 | 0.91 | −14.2 |
| NaCl | 0.50 | 9.8 | 5664 | 2495% | 1.03 | 10.2 | 5737 | 1.01 | −1.9 |
| LiCl | 0.05 | 9.8 | 360 | 159% | 1.02 | 9.8 | 823 | 0.93 | −8.8 |

Example 1: pCDI 1

| Salt | Salt [wt.-%] | Before hot storage | | | | After hot storage 120 h/60° C. | | | Decrease |
|---|---|---|---|---|---|---|---|---|---|
| | | pH | μS/cm | % of μS/cm without salt | meq DCC/g | pH | μS/cm | meq DCC/g | meq DCC/g [%] |
| LiCl | 0.10 | 9.8 | 981 | 432% | 1.02 | 9.8 | 1243 | 0.95 | −6.9 |
| LiCl | 0.20 | 9.7 | 790 | 348% | 1.04 | 9.7 | 2881 | 1.02 | −1.9 |
| LiCl | 0.50 | 9.5 | 1267 | 558% | 1.04 | 9.5 | 6674 | 1.05 | 1.0 |
| $MgCl_2 \cdot 6H_2O$ | 0.05 | 9.6 | 500 | 220% | 1.07 | 10.1 | 284 | 0.90 | −15.9 |
| $MgCl_2 \cdot 6H_2O$ | 0.10 | 9.5 | 700 | 308% | 1.10 | 10.0 | 463 | 0.94 | −14.5 |
| $MgCl_2 \cdot 6H_2O$ | 0.20 | 9.4 | 1261 | 556% | 1.05 | 9.5 | 1014 | 0.94 | −10.5 |
| $MgCl_2 \cdot 6H_2O$ | 0.50 | 9.3 | 2910 | 1282% | 1.04 | 9.3 | 2641 | 0.96 | −7.7 |
| $AlCl_3$ | 0.05 | 6.6 | 373 | 164% | 1.09 | 9.1 | 273 | 0.89 | −18.3 |
| $AlCl_3$ | 0.10 | 3.8 | 577 | 254% | 1.07 | 8.2 | 372 | 0.97 | −9.3 |
| $AlCl_3$ | 0.20 | 3.2 | 961 | 423% | 1.04 | 5.6 | 515 | 0.81 | −22.1 |
| $AlCl_3$ (*) | 0.50 | 3.3 | 4844 | 2134% | 1.01 | 3.2 | 3540 | 0.42 | −58.4 |
| NaI | 0.05 | 9.5 | 316 | 139% | 1.02 | 9.8 | 453 | 0.71 | −30.4 |
| NaI | 0.10 | 9.5 | 327 | 144% | 1.02 | 9.9 | 562 | 0.95 | −6.9 |
| NaI | 0.20 | 9.7 | 591 | 260% | 0.98 | 10.1 | 822 | 0.99 | 1.0 |

Example 2: pCDI 2

| Salt | Salt [wt.-%] | Before hot storage | | | | After hot storage 120 h/60° C. | | | Decrease |
|---|---|---|---|---|---|---|---|---|---|
| | | pH | μS/cm | % of μS/cm without salt | meq DCC/g | pH | μS/cm | meq DCC/g | meq DCC/g [%] |
| without (*) | 0 | 8.8 | 115 | 100% | 1.27 | 9.6 | 163 | 0.78 | −38.6 |
| NaCl | 0.05 | 9.0 | 721 | 627% | 1.27 | 9.6 | 718 | 1.14 | −10.2 |
| NaCl | 0.10 | 9.1 | 1333 | 1159% | 1.27 | 9.6 | 1365 | 1.18 | −7.1 |
| NaCl | 0.20 | 8.9 | 2299 | 1999% | 1.30 | 9.5 | 2324 | 1.21 | −6.9 |
| NaCl | 0.50 | 9.2 | 5388 | 4685% | 1.27 | 9.5 | 5478 | 1.21 | −4.7 |
| LiCl | 0.05 | 9.1 | 546 | 475% | 1.28 | 9.8 | 761 | 1.19 | −7.0 |
| LiCl | 0.10 | 9.1 | 774 | 673% | 1.27 | 9.6 | 1473 | 1.22 | −3.9 |
| LiCl | 0.20 | 9.1 | 1212 | 1054% | 1.27 | 9.6 | 2769 | 1.14 | −10.2 |
| LiCl | 0.50 | 9.2 | 5059 | 4399% | 1.26 | 9.5 | 6352 | 1.26 | 0.0 |
| $MgCl_2 \cdot 6H_2O$ | 0.05 | 8.9 | 424 | 369% | 1.27 | 9.4 | 404 | 1.13 | −11.0 |
| $MgCl_2 \cdot 6H_2O$ | 0.10 | 8.9 | 676 | 588% | 1.28 | 9.4 | 652 | 1.15 | −10.2 |
| $MgCl_2 \cdot 6H_2O$ | 0.20 | 8.9 | 1247 | 1084% | 1.27 | 9.3 | 1240 | 1.26 | −0.8 |
| $MgCl_2 \cdot 6H_2O$ | 0.50 | 8.9 | 2814 | 2447% | 1.29 | 9.1 | 2879 | 1.24 | −3.9 |
| $AlCl_3$ | 0.05 | 4.4 | 387 | 337% | 1.26 | 7.1 | 1336 | 1.10 | −12.7 |
| $AlCl_3$ | 0.10 | 3.7 | 1002 | 871% | 1.16 | 4.2 | 727 | 0.60 | −48.3 |
| $AlCl_3$ | 0.20 | 3.5 | 1841 | 1601% | 1.11 | 3.3 | 534 | 0.44 | −60.4 |
| $AlCl_3$ (*) | 0.50 | 3.1 | 4088 | 3555% | 1.11 | 3.1 | 448 | 0.37 | −66.7 |
| NaI | 0.05 | 9.2 | 228 | 198% | 1.15 | 9.5 | 269 | 1.24 | 7.8 |
| NaI | 0.10 | 9.4 | 366 | 318% | 1.22 | 9.5 | 415 | 1.26 | 3.3 |
| NaI | 0.20 | 9.6 | 703 | 611% | 1.26 | 9.9 | 781 | 1.25 | −0.8 |

Example 3: pCDI 3

| Salt | Salt [wt.-%] | Before hot storage | | | | After hot storage 120 h/60° C. | | | Decrease |
|---|---|---|---|---|---|---|---|---|---|
| | | pH | μS/cm | % of μS/cm without salt | meq DCC/g | pH | μS/cm | meq DCC/g | meq DCC/g [%] |
| without (*) | 0 | 8.1 | 205 | 100% | 1.00 | solidified | | 0.63 | −37.0 |
| LiCl | 0.05 | 8.4 | 468 | 228% | 0.99 | 10.0 | 743 | 0.93 | −6.1 |
| LiCl | 0.10 | 8.3 | 731 | 357% | 1.01 | 10.3 | 1454 | 1.00 | −1.0 |
| LiCl | 0.20 | 8.3 | 1734 | 846% | 1.01 | 10.1 | 2747 | 1.05 | 4.0 |
| LiCl | 0.50 | 8.1 | 1049 | 512% | 1.02 | 10.0 | 6641 | 1.03 | 1.0 |
| KCl | 0.10 | 8.4 | 1244 | 607% | 1.01 | 10.2 | 1107 | 0.90 | −10.9 |
| KCl | 0.20 | 8.4 | 2270 | 1107% | 1.00 | 9.6 | 2084 | 0.94 | −6.0 |

-continued

Example 3: pCDI 3

| Salt | Salt [wt.-%] | Before hot storage | | | | After hot storage 120 h/60° C. | | | Decrease |
|---|---|---|---|---|---|---|---|---|---|
| | | pH | μS/cm | % of μS/cm without salt | meq DCC/g | pH | μS/cm | meq DCC/g | meq DCC/g [%] |
| KBr | 0.10 | 8.5 | 789 | 385% | 1.01 | 9.9 | 674 | 0.91 | −9.9 |
| KBr | 0.20 | 8.5 | 1415 | 690% | 1.01 | 9.8 | 1275 | 0.98 | −3.0 |
| MgSO$_4$ (*) | 0.10 | 8.1 | 685 | 334% | 1.00 | 8.5 | 651 | 0.62 | −38.0 |
| MgSO$_4$ (*) | 0.20 | 8.1 | 1080 | 527% | 0.97 | 8.7 | 1007 | 0.62 | −36.1 |
| CaSO$_4$ (*) | 0.10 | 7.8 | 562 | 274% | 0.97 | 7.5 | 558 | 0.64 | −34.0 |
| CaSO$_4$ (*) | 0.20 | 7.9 | 506 | 247% | 0.99 | 7.9 | 601 | 0.66 | −33.3 |
| NaI | 0.05 | 8.6 | 271 | 132% | 1.01 | 8.8 | 348 | 0.73 | −27.7 |
| NaI | 0.10 | 8.7 | 334 | 163% | 0.96 | 9.2 | 445 | 0.95 | −1.0 |
| NaI | 0.20 | 8.7 | 698 | 340% | 0.95 | 9.4 | 713 | 0.99 | 4.2 |

Example 4: pCDI 4

| Salt | Salt [wt.-%] | Before hot storage | | | | After hot storage 120 h/60° C. | | | Decrease |
|---|---|---|---|---|---|---|---|---|---|
| | | pH | μS/cm | % of μS/cm without salt | meq DCC/g | pH | μS/cm | meq DCC/g | meq DCC/g [%] |
| without (*) | 0 | 8.9 | 157 | 100% | 1.15 | solidified | | 0.67 | −41.7 |
| LiCl | 0.05 | 9.0 | 678 | 432% | 1.14 | 10.1 | 748 | 1.07 | −6.1 |
| LiCl | 0.10 | 8.8 | 718 | 457% | 1.13 | 10.2 | 1426 | 1.13 | 0.0 |
| LiCl | 0.20 | 8.8 | 1309 | 834% | 1.14 | 9.6 | 2693 | 1.10 | −3.5 |
| LiCl | 0.50 | 8.8 | 3733 | 2378% | 1.15 | 9.5 | 6418 | 1.17 | 1.7 |
| KCl | 0.10 | 9.1 | 1195 | 761% | 1.16 | 10.0 | 1110 | 1.07 | −7.8 |
| KCl | 0.20 | 9.2 | 2221 | 1415% | 1.14 | 9.7 | 2081 | 1.05 | −7.9 |
| KBr | 0.10 | 9.3 | 719 | 458% | 1.15 | 9.8 | 668 | 1.07 | −7.0 |
| KBr | 0.20 | 9.4 | 1362 | 868% | 1.15 | 9.9 | 1300 | 1.07 | −7.0 |
| NaI | 0.05 | 9.0 | 216 | 138% | 1.09 | 9.4 | 305 | 0.99 | −9.2 |
| NaI | 0.10 | 9.1 | 370 | 236% | 1.15 | 9.5 | 414 | 1.07 | −7.0 |
| NaI | 0.20 | 9.2 | 706 | 450% | 1.09 | 9.8 | 718 | 1.12 | 2.8 |

Example 5: pCDI 5

| Salt | Salt [wt.-%] | Before hot storage | | | | After hot storage 120 h/60° C. | | | Decrease |
|---|---|---|---|---|---|---|---|---|---|
| | | pH | μS/cm | % of μS/cm without salt | meq DCC/g | pH | μS/cm | meq DCC/g | meq DCC/g [%] |
| without (*) | 0 | 7.1 | 174 | 100% | 1.43 | 7.7 | 174 | 1.18 | −17.5 |
| NaCl | 0.10 | 7.5 | 1269 | 729% | 1.41 | 7.9 | 1262 | 1.35 | −4.3 |
| NaCl | 0.20 | 7.4 | 2325 | 1336% | 1.42 | 7.8 | 2460 | 1.36 | −4.2 |
| NaCl | 0.50 | 7.4 | 5638 | 3240% | 1.38 | 7.9 | 5704 | 1.39 | 0.7 |

Example 6: pCDI 7 (pH of dispersion without addition of salt and before hot storage: 9.4.

| Salt | Salt [wt.-%] | Before hot storage | | | | After hot storage 120 h/60° C. | | | Decrease |
|---|---|---|---|---|---|---|---|---|---|
| | | pH | μS/cm | % of μS/cm without salt | meq DCC/g | pH | μS/cm | meq DCC/g | meq DCC/g [%] |
| without (*) | 0 | 9.4 | 123 | 100% | 1.28 | 9.5 | 160 | 0.97 | −24.2 |
| NaCl | 2.5 | 9.5 | 1764 | 1434% | 1.25 | 9.5 | 1697 | 1.24 | −0.8 |

Example 6: pCDI 7 (pH of dispersion without addition of salt and before hot storage: 9.4.

| | | Before hot storage | | | | After hot storage 120 h/60° C. | | | Decrease |
|---|---|---|---|---|---|---|---|---|---|
| Salt | Salt [wt.-%] | pH | µS/cm | % of µS/cm without salt | meq DCC/g | pH | µS/cm | meq DCC/g | meq DCC/g [%] |
| NaCl | 5.0 | 9.4 | 3350 | 2724% | 1.25 | 9.4 | 3230 | 1.29 | 3.2 |
| KCl | 2.5 | 9.4 | 2078 | 1689% | 1.27 | 9.5 | 1993 | 1.24 | −2.4 |
| KCl | 5.0 | 9.3 | 3943 | 3206% | 1.25 | 9.5 | 3846 | 1.24 | −0.8 |
| KBr | 2.5 | 9.4 | 1566 | 1273% | 1.28 | 9.5 | 1523 | 1.25 | −2.3 |
| KBr | 5.0 | 9.3 | 2912 | 2367% | 1.24 | 9.4 | 2871 | 1.25 | 0.8 |
| LiCl | 2.5 | 9.6 | 1995 | 1622% | 1.26 | 9.7 | 1937 | 1.27 | 0.8 |
| LiCl | 5.0 | 9.5 | 3818 | 3104% | 1.26 | 9.6 | 3725 | 1.27 | 0.8 |
| KF | 2.5 | 9.3 | 1863 | 1515% | 1.26 | 9.5 | 1877 | 1.09 | −13.5 |
| KF | 5.0 | 9.3 | 3402 | 2766% | 1.27 | 9.5 | 3357 | 1.10 | −13.4 |
| NaI | 2.5 | 9.8 | 1506 | 1224% | 1.28 | 10.1 | 1450 | 1.26 | −1.6 |
| NaI | 5.0 | 9.9 | 2871 | 2334% | 1.26 | 10.2 | 2783 | 1.27 | 0.8 |

The invention claimed is:

1. An aqueous dispersion of hydrophilically modified polycarbodiimide resins, comprising:
 a salt component that comprises at least one salt having a cation and an anion that is present in its highest deprotonation level and having a $pK_B$ of ≥9,
 wherein the dispersion has an electrical conductivity in accordance with DIN EN 27888 and measured at 20° C. that is higher than that of a dispersion minus the salt component but otherwise identical,
 wherein, when the salt component comprises magnesium sulfate and/or calcium sulfate, at least one further anion having a $pK_B$ of ≥9 is present in its highest deprotonation level in the salt component, and
 wherein, when the salt component comprises aluminum (III) chloride in a content of 95 mol %, the electrical conductivity of the dispersion in accordance with DIN EN 27888 and measured at 20° C. is ≤1000% of the electrical conductivity of a dispersion minus the salt component but otherwise identical.

2. The dispersion as claimed in claim 1, wherein the dispersion has an electrical conductivity in accordance with DIN EN 27888 and measured at 20° C. that is ≥140% of the electrical conductivity of a dispersion minus the salt component but otherwise identical.

3. The dispersion as claimed in claim 1, wherein the dispersion has an electrical conductivity in accordance with DIN EN 27888 and measured at 20° C. of ≥300 µS/cm.

4. The dispersion as claimed in claim 1, wherein the salt component comprises a halide anion.

5. The dispersion as claimed in claim 1, wherein the salt component comprises an alkali metal cation or an alkaline earth metal cation.

6. The dispersion as claimed in claim 1, wherein the dispersion was additionally at least partially freed of $CO_2$ by application of vacuum.

7. The dispersion as claimed in claim 1, wherein the dispersion has a pH of ≥5 to ≤9.8.

8. The dispersion as claimed in claim 1, wherein the salt component is present in an amount by weight of ≥0.01% to ≤1% based on the total weight of the dispersion.

9. The dispersion as claimed in claim 1, wherein the dispersion contains ≥90% of an original polycarbodiimide content after storage at 60° C. for 120 hours.

10. A method for preparing an aqueous dispersion of hydrophilically modified polycarbodiimide resins, comprising:
 A) reacting a polyisocyanate in the presence of a carbodiimidization catalyst to obtain a polycarbodiimide;
 B) adding a compound that contains at least one group reactive toward isocyanate and/or carbodiimide groups during or after polycarbodiimide formation to form a hydrophilized polycarbodiimide;
 C) dispersing the hydrophilized polycarbodiimide in water to obtain a dispersion; and
 D) adding a salt component to at least one of:
  the water used to obtain the dispersion,
  the dispersion,
  the polyisocyanate, or
  the compound
 wherein the dispersion has an electrical conductivity in accordance with DIN EN 27888 and measured at 20° C. that is higher than that of a dispersion minus the salt component but otherwise identical,
 wherein the salt component comprises at least one salt having a cation and an anion that is present in its highest deprotonation level and having a $pK_B$ of ≥9,
 wherein, when the salt component comprises magnesium sulfate and/or calcium sulfate, at least one further anion having a $pK_B$ of ≥9 is present in its highest deprotonation level in the salt component, and
 wherein, when the salt component comprises aluminum (III) chloride in a content of ≥95 mol %, the electrical conductivity of the dispersion in accordance with DIN EN 27888 and measured at 20° C. is ≤1000% of the electrical conductivity of a dispersion minus the salt component but otherwise identical.

11. The method as claimed in claim 10, wherein the compound comprises a hydrophilic group and at least one group reactive toward isocyanate and/or carbodiimide groups.

12. The method as claimed in claim 10, wherein the salt component comprises a halide anion and/or an alkali metal cation or alkaline earth metal cation.

13. The method as claimed in claim 10, wherein the dispersion was additionally at least partially freed of $CO_2$ by application of vacuum.

14. The method as claimed in claim 10, wherein the polyisocyanate is an aliphatic polyisocyanate.

15. A method of reducing carbodiimide hydrolysis in aqueous dispersions of hydrophilically modified polycarbodiimide resins, comprising:
- adding a salt component to a hydrophilically modified polycarbodiimide resin, wherein the salt component comprises at least one salt having a cation and an anion that is present in its highest deprotonation level and having a $pK_B$ of $\geq 9$,
- wherein, when the salt component comprises at least one of aluminum(III) chloride, magnesium sulfate, or calcium sulfate, at least one further anion is present in the salt component in its highest deprotonation level and having a $pK_B$ of $\geq 9$.

\* \* \* \* \*